United States Patent
Hammerstiel et al.

(10) Patent No.: US 11,408,469 B2
(45) Date of Patent: Aug. 9, 2022

(54) FRICTION CLUTCH FOR A DRIVETRAIN OF A MOTOR VEHICLE HAVING AT LEAST AN ACTUATING SURFACE FORMED BY AT LEAST ONE CONNECTING MEANS

(71) Applicant: Schaeffler Technologies AG & Co. KG, Herzogenaurach (DE)

(72) Inventors: Fabian Hammerstiel, Karlsruhe (DE); Christoph Raber, Ottweiler-Steinbach (DE); Marc Finkenzeller, Gengenbach (DE); Marcel Röll, Ottersweier (DE); Florian Vogel, Bühl (DE); Michael Aschoff, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/971,830

(22) PCT Filed: Jan. 22, 2019

(86) PCT No.: PCT/DE2019/100066
§ 371 (c)(1),
(2) Date: Aug. 21, 2020

(87) PCT Pub. No.: WO2019/161830
PCT Pub. Date: Aug. 29, 2019

(65) Prior Publication Data
US 2020/0393005 A1      Dec. 17, 2020

(30) Foreign Application Priority Data

Feb. 22, 2018   (DE) .......................... 102018103982.4
Apr. 5, 2018    (DE) .......................... 102018108046.8

(51) Int. Cl.
*F16D 13/70*   (2006.01)
*B60K 6/387*   (2007.10)
(Continued)

(52) U.S. Cl.
CPC .............. *F16D 13/70* (2013.01); *B60K 6/387* (2013.01); *F16D 13/38* (2013.01); *F16D 13/56* (2013.01);
(Continued)

(58) Field of Classification Search
CPC ......... B60K 6/387; F16D 13/38; F16D 13/52; F16D 13/56; F16D 13/68; F16D 13/70;
(Continued)

(56) References Cited

U.S. PATENT DOCUMENTS

| 11,225,132 B2 * | 1/2022 | Hoppe ..................... B60K 6/40 |
| 2006/0289209 A1 * | 12/2006 | Grosspietsch .......... B60K 6/26 180/65.25 |

(Continued)

FOREIGN PATENT DOCUMENTS

| CN | 105422679 A | 3/2016 |
| DE | 112013000295 T5 | 8/2014 |

(Continued)

*Primary Examiner* — Richard M Lorence

(57) ABSTRACT

A friction clutch for a drivetrain of a motor vehicle includes and input part, an output part, a spring device, a pressure pot, and a connecting means connecting the pressure pot to the inner-plate carrier. The input part includes an outer-plate carrier which is rotatable about an axis of rotation by a drive motor, and an outer plate rotationally fastened to the outer-plate carrier. The input part includes a rotor carrier, an inner-plate carrier separate from the rotor carrier, and an inner plate rotationally fastened to the inner-plate carrier. The spring device is for bracing the outer plate and the inner plate together with a pressing force to close the friction clutch. The connecting means includes an actuating surface via which the friction clutch can be actuated by an actuating device.

20 Claims, 1 Drawing Sheet

(51) Int. Cl.
  *F16D 13/38* (2006.01)
  *F16D 13/68* (2006.01)
  *F16D 13/75* (2006.01)
  *F16D 28/00* (2006.01)
  *F16D 25/0638* (2006.01)
  *F16D 13/71* (2006.01)
  *F16D 13/56* (2006.01)
  *F16D 121/24* (2012.01)

(52) U.S. Cl.
  CPC ............ *F16D 13/68* (2013.01); *F16D 13/71* (2013.01); *F16D 13/75* (2013.01); *F16D 25/0638* (2013.01); *F16D 28/00* (2013.01); *F16D 2013/706* (2013.01); *F16D 2121/24* (2013.01); *F16D 2250/0061* (2013.01)

(58) Field of Classification Search
  CPC .... F16D 2013/706; F16D 13/71; F16D 13/75; F16D 25/0638; F16D 28/00; F16D 2121/24; F16D 2250/0061
  See application file for complete search history.

(56) References Cited

U.S. PATENT DOCUMENTS

| | | | |
|---|---|---|---|
| 2012/0111145 | A1 | 5/2012 | Maekawa et al. |
| 2017/0057489 | A1* | 3/2017 | Schaefer ............... B60W 20/40 |
| 2017/0203643 | A1* | 7/2017 | Suyama .................. F16D 21/02 |

FOREIGN PATENT DOCUMENTS

| | | |
|---|---|---|
| DE | 202018006174 U1 | 7/2019 |
| WO | 2019161827 A1 | 8/2019 |
| WO | 2019161828 A | 8/2019 |
| WO | 2019161829 A1 | 8/2019 |

* cited by examiner

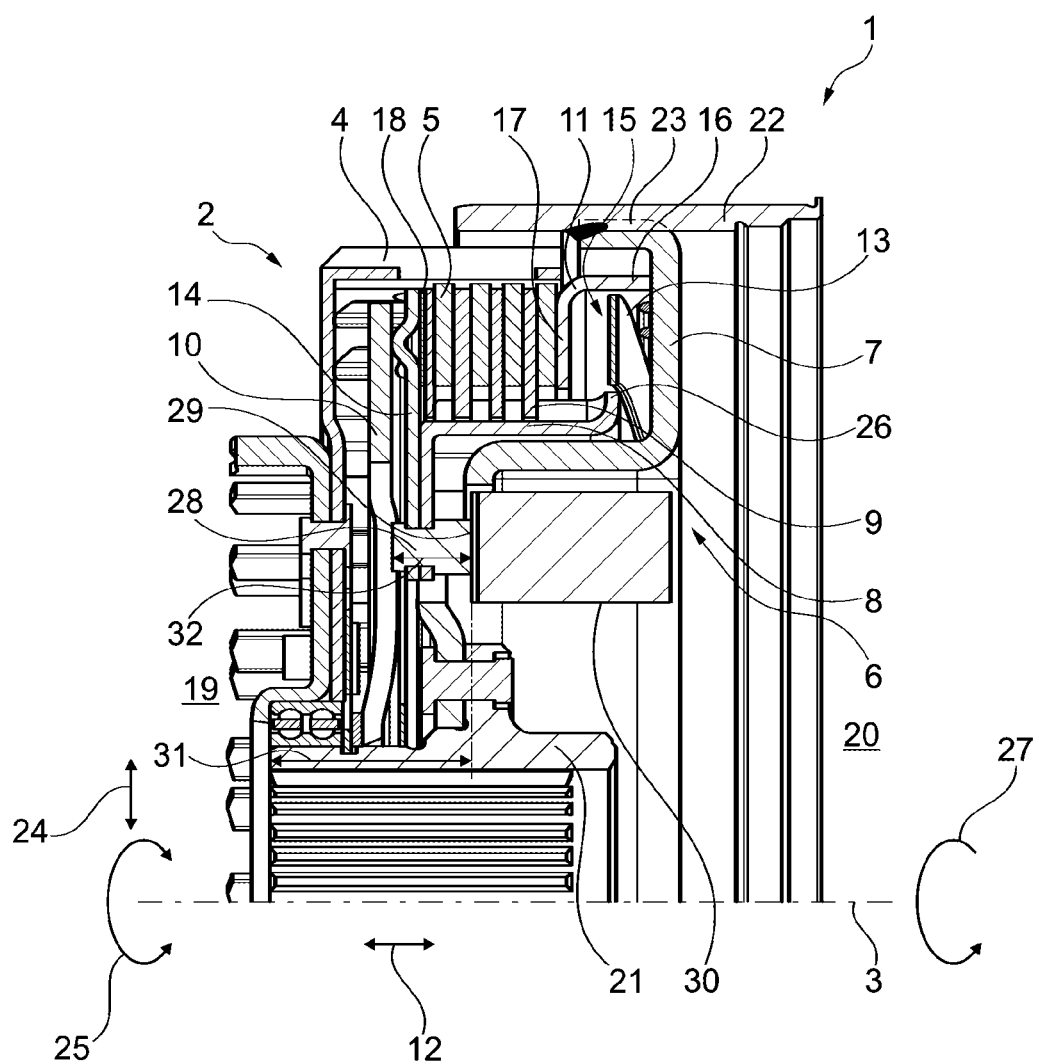

# FRICTION CLUTCH FOR A DRIVETRAIN OF A MOTOR VEHICLE HAVING AT LEAST AN ACTUATING SURFACE FORMED BY AT LEAST ONE CONNECTING MEANS

CROSS-REFERENCE TO RELATED APPLICATIONS

This application is the United States National Phase of PCT Appln. No. PCT/DE2019/100066 filed Jan. 22, 2019, which claims priority to German Application No. DE102018103982.4 filed Feb. 22, 2018 and DE102018108046.8 filed Apr. 5, 2018, the entire disclosures of which are incorporated by reference herein.

TECHNICAL FIELD

The present disclosure relates to a friction clutch for the drivetrain of a motor vehicle. Friction clutches are used in the drivetrain of motor vehicles, such as passenger cars, trucks or motorcycles, to balance a drive speed and a gearbox speed, for example when the vehicle is started.

BACKGROUND

Known friction clutches can be actuated, in particular disengaged and/or engaged, by an actuating device such as a central release device. For this purpose, an actuating surface is formed in the friction clutch, via which the friction clutch can be actuated by the actuating device. Since friction clutches consist of a large number of components, the dimensions of which are subject to tolerances, the position of the actuating surface is subject to considerable fluctuations. In the most unfavorable cases, the actuating device may have to travel a considerable additional distance before it encounters a friction clutch end stop when operating the friction clutch. In the friction clutch, this additional distance traveled by the actuating device results in the individual components traveling additional distances, which must be provided with additional installation space to prevent collision of the individual components. This increases the size of the friction clutch.

SUMMARY

Example embodiment broadly comprise a friction clutch for a drivetrain of a motor vehicle, having at least the following components:
- an input part having an outer-plate carrier which is rotatable about an axis of rotation by at least one drive motor, wherein at least one outer plate is fastened to the outer-plate carrier;
- an output part with a rotor carrier and an inner-plate carrier separate from the rotor carrier, wherein at least one inner plate is fastened to the inner-plate carrier;
- at least one spring device by means of which the at least one outer plate and the at least one inner plate can be braced together with a pressing force to close the friction clutch; and
- a pressure pot which is connected by at least one connecting means to the inner-plate carrier, wherein the at least one connecting means has an actuating surface via which the friction clutch can be actuated by an actuating device.

The proposed (dry) friction clutch, e.g. the dry multi-plate clutch, is intended for the drivetrain of a motor vehicle, e.g. a passenger car, truck and/or motorcycle. Such motor vehicles regularly have at least one drive motor that drives the vehicle. The at least one drive motor may, for example, be a hybrid engine having both an internal combustion engine and at least one electric drive to drive the motor vehicle. For example, the at least one electric motor can be operated with an operating voltage of 24 V (Volts) or 48 V. In addition, such motor vehicles are regularly equipped with a gearbox, which may be an automatic gearbox or a manual gearbox operated manually by a driver.

The friction clutch includes an input part on the drive side, which is arranged to rotate about an axis of rotation by means of the drive motor and which can be connected directly or indirectly, e.g. to a crankshaft of the drive motor or the internal combustion engine of the hybrid drive. In addition, the friction clutch includes an output part which is arranged coaxially to the input part and is rotatable about the axis of rotation, which can be connected indirectly or directly, e.g. to a gearbox input shaft of the gearbox. The output part also has a rotor carrier, which can be connected to a rotor of the electric motor of a hybrid drive and/or can be driven by the electric motor about the axis of rotation.

The electric motor can be arranged coaxially to the axis of rotation of the friction clutch or to the axis of rotation of the rotor carrier such that the rotor of the electric motor encloses the rotor carrier. For example, the rotor carrier can be connected to the rotor of the electric motor via gear teeth at the circumferential surface of the rotor carrier. In addition, the electric motor can be arranged parallel to the axis of rotation of the friction clutch or to the axis of rotation of the rotor carrier. In this case, the electric motor can drive a pulley that at least partially encloses the friction clutch.

The friction clutch is thus integrated into a hybrid module for coupling an internal combustion engine to the drivetrain of the motor vehicle or for decoupling the internal combustion engine from the drivetrain of the motor vehicle, i.e. the friction clutch forms a KO clutch. The hybrid module may be a hybrid module with a coaxial electric motor, the rotor of which surrounds the KO clutch, or a hybrid module with an electric motor parallel to the axis driving a pulley surrounding the KO clutch. In the latter case, this pulley of the rotor carrier and the rotor is made of one piece, or the pulley is supported by the rotor carrier, i.e. pulled onto the rotor carrier at its outer circumference.

Between the input part and the output part, there is a friction unit that acts in a circumferential direction about the axis of rotation and can be switched between an open and a closed position. The friction unit includes at least one outer plate, which is non-rotatably connected to an outer-plate carrier of the input part, and at least one inner plate, which is non-rotatably connected to an inner-plate carrier of the output part. The at least one outer plate can be connected to the outer-plate carrier via a toothing and/or the at least one inner plate can be connected to the inner-plate carrier via a toothing. The inner-plate carrier is, for example, ring-shaped, at least partly tubular, at least partly made of steel and/or has an L-shaped cross-section. Furthermore, the inner-plate carrier is separated from the rotor carrier. This means that the inner-plate carrier is not coupled directly or indirectly to the rotor carrier circumferentially about the axis of rotation. Furthermore, the inner-plate carrier can be shifted in the axial direction, i.e. parallel to axis of rotation, in relation to the rotor carrier by limited movements.

The friction clutch has a pressure pot with which the inner-plate carrier is firmly connected by at least one connecting means. The friction clutch can be actuated via the pressure pot. In addition, it may be possible to transmit a pressing force generated by at least one spring device via the pressure pot to the at least one outer plate and the at least one inner plate. The at least one spring device presses, for example, from one engine side of the friction clutch onto the pressure pot, so that the pressure pot transmits the pressing force to the inner-plate carrier. The friction clutch may be disengaged by means of an actuating device, e.g. of the central release device type, by the actuating device generating an actuating force opposing the pressing force via an actuating surface of the at least one connecting means on the pressure pot. Due to the disengaging force, the pressure pot can be displaced in the axial direction to a limited extent.

The at least one connecting means may comprise a bolt. Due to the design of the actuating surface on the at least one connecting means, dimensional tolerances of the individual components of the friction clutch can be compensated by an adapted design of the at least one connecting means. In particular, by means of a specific adaptation of the at least one connecting means, e.g. by adjusting the length and/or position of the at least one connecting means, a setting surface height of the setting surface (depending on the previously measured dimensional tolerances of the individual components of the friction clutch) can be set to a defined target actuating surface height. This means that no additional installation space for an actuating device to travel additional distances needs to be provided in the friction clutch, so that the friction clutch can be designed in an especially compact way. The actuating surface height can be, for example, a distance of the actuating surface from an end face of a hub of the friction clutch in the axial direction. The hub can be used for the (direct or indirect) connection of the friction clutch with a gearbox input shaft of the gearbox or an intermediate shaft and/or can be part of the output part of the friction clutch.

A modulation spring can be arranged between the inner-plate carrier and the pressure pot. The modulation spring may have a fixed end and a free end, wherein the fixed end is connected, for example, to the inner-plate carrier. The free end protrudes in the axial direction from the inner-plate carrier, for example, in the direction of the pressure pot. In this way, the engagement of the friction clutch can be smoother if the pressing force is provided. In addition, at least one inner plate is not (directly) connected to the rotor carrier. The at least one outer plate and the at least one inner plate can be arranged alternately in the axial direction, i.e. in particular parallel to the axis of rotation, in layers to form a plate pack. In addition, the at least one outer plate and/or the at least one inner plate are, for example, annular and/or at least partially made of steel. In addition, the at least one outer plate and/or the at least one inner plate may have friction linings.

The at least one outer plate and the at least one inner plate may be tensioned or brought into frictional engagement by a pressing force of at least one spring device for closing or engaging the friction clutch. The at least one spring device is, for example, a disc spring. The friction clutch may be normally engaged by the at least one spring device.

In addition, the friction clutch can have the following components:
a spacer plate by means of which the at least one outer plate and the at least one inner plate are spaced apart from the rotor carrier in the axial direction; and
at least one leaf spring, which is connected to the inner-plate carrier and the rotor carrier in such a way that the at least one leaf spring reinforces the pressing force with a reinforcing force when a torque is introduced by the drive motor.

The spacer plate can be connected to the rotor carrier by means of a form-fit connection. Due to the form-fit connection of the spacer plate to the rotor carrier, a torque of the drive motor applied to the spacer plate can be transmitted to the rotor carrier. In addition, the spacer plate can be secured against turning relative to the rotor carrier by means of the form-fit connection to the rotor carrier. Furthermore, by means of the spacer plate, the at least one outer-plate and the at least one inner-plate are spaced apart from the rotor carrier in the axial direction.

The at least one leaf spring can be connected to the inner-plate carrier and the rotor carrier in such a way that when torque is introduced by the drive motor or the internal combustion engine of the hybrid drive, the at least one leaf spring reinforces the pressing force with a reinforcing force. This is achieved by the fact that at least one leaf spring is installed between the inner-plate carrier and the rotor carrier or is arranged with an installation angle. This means, for example, that the at least one leaf spring is at least partially not parallel to the axial direction and/or the radial direction. The torque introduced via the inner-plate carrier into the at least one leaf spring results in a force with an axial directional component due to the installation angle. The axial directional component of the force represents a reinforcing force, which, for example, acts in the same direction as the pressing force of the at least one spring device and thus reinforces it.

In the friction clutch, a plurality of leaf springs can be stacked on top of each other in the form of at least one leaf spring package. If a tensile torque is transmitted from the drive motor via the outer-plate carrier and the at least one outer plate to the at least one inner plate and the inner-plate carrier, the inner-plate carrier transmits this tensile torque to the rotor carrier via the at least one installed leaf spring. Due to the installation angle of the at least one leaf spring, the reinforcing force in the axial direction is generated by the transmitted torque. The reinforcing force acts, for example, in the direction of a gearbox side on the inner-plate carrier. Since the pressing force of the at least one spring device can also act on the inner-plate carrier, the pressing force generated by the at least one spring device is reinforced by the reinforcing force of the at least one leaf spring acting in the direction of the gearbox side. In this way, losses in pressing force can be compensated.

The pressing force can be supported by the spacer plate, in particular on the gearbox side. The spacer plate serves both as an end plate in the friction clutch, which prevents the rotor carrier itself from acting as a friction surface, and as a spacer between the plate pack, i.e. the at least one outer plate and the at least one inner plate, and the rotor carrier in order to be able to accommodate the at least one installed leaf spring between the plate pack and the rotor carrier.

The at least one leaf spring is connected, for example, on a gearbox side of the friction clutch with the rotor carrier and on an engine side of the friction clutch with the inner-plate carrier. By connecting the leaf springs on the gearbox side to the rotor carrier, and on the engine side to the inner-plate carrier, the at least one leaf spring is put under tension when using the reinforcement function. Compared to a shear load for using the reinforcement function, this has considerable advantages for the at least one leaf spring with regard to its dimensioning. Leaf springs loaded under tension can be dimensioned smaller for the same load.

The inner-plate carrier is non-rotatably connected to a pressure pot via which the friction clutch can be actuated. The spacer plate can support the pressing force. In addition, the spacer plate can form a mounting space for the at least one leaf spring. In particular, the at least one leaf spring is completely arranged in the mounting space. In addition, the inner-plate carrier can protrude into the mounting space. The spacer plate can have a tubular section and a flanged section. The spacer plate is made, for example, in one piece. The reinforcing force can be directed in the axial direction. The reinforcing force can be directed in the direction of a gearbox side of the friction clutch. The at least one leaf spring can be put under tension with the reinforcing force when the pressing force is reinforced. This means that the at least one leaf spring can be made smaller and therefore with a lower weight.

The at least one leaf spring can be riveted to the inner-plate carrier. The at least one leaf spring is riveted to the inner-plate carrier, for example, at a first longitudinal end. The at least one leaf spring may be connected and/or riveted to the rotor carrier at a second longitudinal end opposite the first longitudinal end in a rotationally fixed or non-rotational manner. The at least one leaf spring can be arranged in the axial direction next to the spacer plate. For example, the at least one leaf spring may not be located radially inside the inner-plate carrier and/or the spacer plate. A cross-section of the inner-plate carrier can be L-shaped, for example.

The spacer plate may have at least one lug, which fits into at least one recess of the rotor carrier. The spacer plate may have a plurality of plates distributed in the circumferential direction about the axis of rotation. The at least one lug may extend in the axial direction and/or be located on the underside of the spacer plate. The at least one recess is, for example, an opening of the rotor carrier. The at least one recess may run completely through the rotor carrier. The at least one lug engages in the at least one recess in such a way that the spacer plate is connected to the rotor carrier by means of a form-fit connection and secured against rotation relative to the rotor carrier.

The at least one lug can center the spacer plate in the friction clutch. This means, for example, that the spacer plate can be aligned or arranged coaxial to the rotor carrier by means of at least one lug. The at least one lug can extend in the axial direction. The at least one recess can extend in the axial direction. The outer-plate carrier can be rotatably mounted on a hub by means of a bearing, wherein a bearing seat of the bearing is at least partially formed by a drive gear rim of the input part. The bearing is, for example a rolling bearing or roller bearing.

The hub can be at least partially tubular, can serve to (directly or indirectly) connect the friction clutch to a gearbox input shaft of the gearbox or an intermediate shaft and/or can be part of the output part of the friction clutch. The bearing can have an inner ring and an outer ring. The bearing is located, for example, in the drive gear rim. This can mean that the bearing is in (direct) contact with the drive gear rim, for example, with the outer ring. The bearing can also be arranged on the hub, for example, with the inner ring.

The drive gear rim can have internal or external teeth, through which the torque can be transmitted from the drive motor to the input part of the friction clutch. The bearing seat of the bearing can be formed at least partially by the drive gear rim and the outer-plate carrier. This means that the bearing seat of the bearing can also be formed by the outer-plate carrier. The drive gear rim and the outer-plate carrier may be arranged (directly) next to each other in the axial direction. An inner diameter of the drive gear rim can correspond to an outer diameter of the bearing. An interference fit can be formed between the inner diameter of the drive gear rim and the outer diameter of the bearing.

The bearing can be of double row design. In a double row bearing, the rolling elements of the bearing can run in two adjacent (in the axial direction) annular rolling element raceways. The bearing can be supported in the axial direction by a central screw with which a hub of the friction clutch can be mounted on a shaft. In particular, the shaft can be an intermediate shaft via which the torque can be transmitted to the gearbox input shaft of the gearbox. For example, the central screw can be tightened on one end face of the hub and/or coaxially to the hub on the friction clutch. The central screw supports the inner ring of the bearing, for example, in the axial direction. This means, for example, that the central screw is in contact with the inner ring so that the bearing cannot move in the axial direction relative to the hub. This eliminates the need to secure the bearing with a circlip.

At least one connecting means can be a rivet or a screw. The actuating surface can be orthogonal to the axis of rotation. The actuating surface can have an actuating surface height that is adjustable. For this purpose, the friction clutch may, for example, have a thread by means of which the at least one connecting means can be adjusted, for example, in the axial direction.

According to a further aspect of the disclosure, a method for manufacturing a friction clutch according to the disclosure is also proposed, wherein a pressure pot is connected to an inner-plate carrier by at least one connecting means, wherein the at least one connecting means has an actuating surface via which the friction clutch can be actuated with an actuating device, and wherein an actuating surface height of the actuating surface is adjusted to a desired actuating surface height. The proposed method prevents the actuating surface height from fluctuating due to dimensional tolerances of the individual components of the friction clutch. By adapting the actuating surface height to the desired actuating surface height, no additional installation space for the actuating device to travel additional distances needs to be provided in the friction clutch, so that the friction clutch can be designed in an especially compact way. The actuating surface height can be, for example, a distance of the actuating surface from an end face of a hub of the friction clutch in the axial direction. For further details, reference is made to the description of the friction clutch.

The actuating surface height can be adjusted by selecting a suitable length of the at least one connecting means. When using rivets as connecting means, rivets with different bolt collar lengths can be used, for example. Here, before riveting the bolt, the rivet height or the actuating surface height is measured, which is determined from the individual components of the friction clutch with tolerances. According to the desired target actuating surface height, a bolt is used as a rivet, the collar length of which is matched to the measured dimensional tolerances of the individual components of the friction clutch.

The actuating surface height can be adjusted by placing at least one washer under the at least one connecting means. The at least one washer can be e.g. annular and/or be in the shape of a ring washer. In addition, the at least one washer can be arranged between a rivet or screw head of the at least one connecting means and a component of the friction clutch, for example, the inner-plate carrier. The at least one connecting means can be underlaid with a plurality of washers and/or with washers of a different washer thickness (in the axial direction) until the actuating surface height of the actuating surface of the at least one connecting means reaches the desired actuating surface height. This allows the use of rivets, the bolts of which have the same bolt collar length. The bolt collar length is always less than the required length. The variation in the actuating surface height is then compensated for by placing the at least one connecting means under the at least one washer.

The actuating surface height can be adjusted by compressing at least one connecting means. In compressing, for example, a bolt is plastically deformed by pressure and/or shortened in the axial direction, for example, using a punch. A rivet or bolt may be used, the bolt collar length of which is greater than required. In addition, after riveting the at least one connecting means, the at least one connecting means can be specifically compressed to the desired actuating surface height in a second riveting process. Furthermore, the at least one connecting means may have a compression region, which e.g. could be designed in the form of a taper (in the radial direction). This allows the compression of the at least one connecting means (in the axial direction) with a lower force.

The actuating surface height can be adjusted by screwing at least one connecting means into a thread. For this purpose, the at least one connecting means may be in the form of a screw, for example. The adaptation of the actuating surface height to the desired actuating surface height can be individually adjusted by screwing at least one connecting means into the thread, thus compensating for variations in the actuating surface height.

BRIEF DESCRIPTION OF THE DRAWINGS

Both the disclosure and the technical field will be explained in more detail below, with reference to the FIGURE. It should be noted that the FIGURE shows an example variant of the disclosure, but is not limited thereto. In an exemplary and schematic manner, the single FIGURE shows a friction clutch in longitudinal section.

DETAILED DESCRIPTION

The single FIGURE shows a friction clutch 1 in longitudinal section. The friction clutch 1 is a dry multi-plate clutch, for example. The friction clutch 1 has an input part 2 on the engine side 19 and an output part 6 on the gearbox side 20. The input part 2 includes an outer-plate carrier 4, which is rotatable about an axis of rotation 3 by a drive motor or internal combustion engine, not shown here, to which four outer plates 5 are rotationally fastened by a toothing, not shown here. The output part 6 includes an inner-plate carrier 8, which is arranged coaxially to the outer-plate carrier 4 and can also be rotated about the axis of rotation 3, to which four inner plates 9 are non-rotatably fastened by a toothing, also not shown here.

The outer plates 5 and the inner-plate carrier 8 can be tensioned by a spring device 10, which is a diaphragm spring here, to close the friction clutch 1. For this purpose, a pressing force of the spring device 10 can be transmitted to the inner-plate carrier 8 via a pressure pot 14 and a modulation spring 18. The pressing force is supported by a spacer plate 11. The spacer plate 11 is annular and has a tubular section 16 and a flanged section 17. Furthermore, the spacer plate 11 spaces apart the outer plates 5 and the inner plates 9 in the axial direction 12, i.e. parallel to the axis of rotation 3, from a rotor carrier 7 of the output part 6. In addition, the spacer plate 11 forms a mounting space 15 for a plurality of leaf springs 13. The plurality of leaf springs 13 are arranged in the circumferential direction 25 distributed about the axis of rotation 3 and each extend from a collar 26 of the inner-plate carrier 8, which is oriented in the radial direction 24, in the circumferential direction 25 and in the axial direction 12 to the rotor carrier 7, which is only partly shown here. The leaf springs 13 are riveted at a first longitudinal end of the leaf springs 13 to the inner-plate carrier 8 and at an opposite second longitudinal end of the leaf springs 13 to the rotor carrier 7. When the friction clutch 1 is closed, a torque of a drive motor can thus be transmitted to the rotor carrier 7 via the outer-plate carrier 4, the outer plates 5, the inner plates 9, the inner-plate carrier 8 and the leaf springs 13.

The leaf springs 13 are mounted between the inner-plate carrier 8 and the rotor carrier 7 in such a way or with a mounting angle that the torque introduced via the inner-plate carrier 8 into the leaf springs 13 as a tensile force generates a force with an axial directional component. The axial directional component of the force represents a reinforcing force that acts on the inner-plate carrier 8 in the axial direction 12 in the direction of the gearbox side 20 so that the pressing force of the spring device 10 is reinforced and pressing force losses are compensated.

The friction clutch 1, viewed from the gearbox side 20 rotates counterclockwise about the axis of rotation 3 in the direction of rotation 27, whereby the leaf springs 13 are loaded under tension in order to use the reinforcing function of the leaf springs 13. If, with the friction clutch 1 engaged, a torque in the direction of rotation 27 is applied by the internal combustion engine, not shown, to the inner plates 9 and the inner-plate carrier 8 via the outer-plate carrier 4 and the outer plates 5, coming from the engine side 19, the torque in the direction of rotation 27 ensures that the frictional connection between the outer plates 5 and inner plates 9 is reinforced by the tension-loaded leaf springs 13, as the collar 26 of the inner-plate carrier 8, which can be moved in the axial direction 12, is pulled in the direction of the rotor carrier 7. This increases the torque capacity of the friction clutch 1, allowing the friction clutch 1 to be designed smaller than it would have been without the reinforcing function of the leaf springs 13. In other words, pressing force losses can be compensated by the reinforcing function of the leaf springs 13.

The pressure pot 14 is of annular design and radially internally connected to the inner-plate carrier 8 by a plurality of circumferentially 25 distributed connecting means 28, which here are in the form of rivets, in a torsion-resistant manner. The connecting means 28 have a connecting means length 32 in the axial direction 12. In addition, an end face of the connecting means 28 at one end of the connecting means 28 on the longitudinal side in the axial direction 12 forms an actuating surface 29, via which an actuating force can be introduced against the pressing force of the spring device 10 for disengaging the friction clutch 1 in the direction of the engine side 19 by means of an actuating device 30, shown here only schematically.

The actuating device 30 is arranged at least partly in the radial direction 24 within the rotor carrier 7. The actuating device 30 is in direct contact with the actuating surface 29. The actuating surface 29 has an actuating surface height 31 that corresponds to a distance of the actuating surface 29 from an engine-side end face of a hub 21 of the friction clutch 1 in the axial direction 12. Here, the actuating surface height 31 was adjusted to a target actuating surface height by compressing the connecting means 28 in the axial direction 12. Alternatively or cumulatively, the rotor carrier 7 is rotatable about the axis of rotation 3 by the rotor 22 of an electric motor, not shown here. For this purpose, the rotor carrier 7 is non-rotatably connected to the rotor 22 via its circumferential surface 23. Furthermore, the rotor carrier 7 is non-rotatably connected to the hub 21 so that the hub 21, together with the rotor carrier 7, is rotatable about the axis of rotation 3.

The friction clutch 1, e.g., the dry multi-plate clutch, is designed for a hybrid module, not shown, for coupling and decoupling an internal combustion engine to and from the drivetrain of a motor vehicle, i.e. the friction clutch 1 forms a KO clutch. The hybrid module may be a hybrid module with a coaxial electric motor, the rotor of which surrounds the KO clutch, or a hybrid module with an electric motor parallel to the axis driving a pulley surrounding the KO clutch. In the latter case, this pulley of the rotor carrier 7 and the rotor 22 is constructed in one piece, or the pulley is supported by the rotor carrier 7, i.e. pulled at its outer circumference onto the rotor carrier 7.

REFERENCE NUMERALS

1 Friction clutch
2 Input part
3 Axis of rotation
4 Outer-plate carrier
5 Outer plate
6 Output part
7 Rotor carrier
8 Inner-plate carrier
9 Inner plate
10 Spring device
11 Spacer plate
12 Axial direction
13 Leaf spring
14 Pressure pot
15 Mounting space
16 Tubular section
17 Flanged section
18 Modulation spring
19 Engine side
20 Gearbox side
21 Hub
22 Rotor
23 Circumferential surface
24 Radial direction
25 Circumferential direction
26 Collar
27 Direction of rotation
28 Connecting means
29 Actuating surface
30 Actuating device
31 Actuating surface height
32 Connection means length

The invention claimed is:

1. A friction clutch for a drivetrain of a motor vehicle, comprising:
    an input part comprising:
        an outer-plate carrier which is rotatable about an axis of rotation by a drive motor; and
        an outer plate rotationally fastened to the outer-plate carrier;
    an output part comprising:
        a rotor carrier;
        an inner-plate carrier separate from the rotor carrier; and
        an inner plate rotationally fastened to the inner-plate carrier;
    a spring device for bracing the outer plate and the inner plate together with a pressing force to close the friction clutch; and
    a pressure pot; and
    a connecting means connecting the pressure pot to the inner-plate carrier, the connecting means comprising an actuating surface via which the friction clutch can be actuated by an actuating device.

2. The friction clutch of claim 1, further comprising:
    a spacer plate arranged to axially separate the outer plate and the inner plate from the rotor carrier; and
    a leaf spring:
        connected to the inner-plate carrier and the rotor carrier; and
        arranged to reinforce the pressing force with a reinforcing force when a torque is introduced to the input part by the drive motor.

3. The friction clutch of claim 1, wherein the connecting means is a rivet or a screw.

4. The friction clutch of claim 1, wherein the actuating surface is orthogonal to the axis of rotation.

5. The friction clutch of claim 1, wherein the actuating surface comprises an adjustable actuating surface height.

6. A method for producing the friction clutch of claim 1 comprising adjusting an actuating surface height of the actuating surface to a desired actuating surface height.

7. The method of claim 6, wherein a connecting means length of the connecting means is selected to adjust the actuating surface height.

8. The method of claim 6, wherein a washer is placed under the connecting means to adjust the actuating surface height.

9. The method of claim 6, wherein the connecting means is compressed to adjust the actuating surface height.

10. The method of claim 6, wherein the connecting means is screwed into a thread to adjust the actuating surface height.

11. A friction clutch for a hybrid vehicle comprising:
    an axis of rotation;
    a first plate carrier arranged for driving engagement with a combustion engine;
    a first clutch plate rotationally fixed to the first plate carrier;
    a rotor carrier arranged for receiving a motor torque from an electric motor;
    a second plate carrier fixed to the rotor carrier and arranged for driving engagement a gearbox;
    a second clutch plate rotationally fixed to the second plate carrier;
    a rivet comprising a distal end with an actuating surface for receiving an actuating force from an actuating device to open the friction clutch;
    a pressure pot fixed to the second plate carrier by the rivet;
    a spring device arranged to apply a pressing force to the pressure pot to press the first clutch plate and the second clutch plate together to transmit a clutch torque; and
    a leaf spring rotationally connecting the second clutch plate to the rotor carrier and arranged to apply a reinforcing force to the first clutch plate and the second clutch plate to increase the clutch torque when an engine torque is provided by the combustion engine.

12. The friction clutch of claim 11 wherein the actuating surface is orthogonal to the axis of rotation.

13. The friction clutch of claim 11 wherein the actuating surface comprises an adjustable actuating surface height.

14. The friction clutch of claim 13 wherein the adjustable actuating surface height is adjustable by:
    selecting a length of the rivet;

placing a washer between the actuating surface and the second plate carrier; or compressing the rivet.

15. The friction clutch of claim 11 further comprising a hub, wherein:

the spring device is axially fixed relative to the hub in a first axial direction; and the rotor carrier is fixed to the hub.

16. The friction clutch of claim 11 wherein the spring device is disposed axially between the first plate carrier and the pressure pot.

17. The friction clutch of claim 11 wherein the spring device comprises a plurality of radially inwardly extending fingers and the rivet is arranged circumferentially between two of the plurality of radially inwardly extending fingers.

18. The friction clutch of claim 11 wherein the leaf spring is arranged to pull the pressure pot axially towards the rotor carrier when the engine torque is provided.

19. The friction clutch of claim 11 further comprising a spacer plate disposed axially between the first clutch plate and the rotor carrier.

20. The friction clutch of claim 19 wherein the spacer plate comprises:

a flanged section orthogonal to the axis of rotation; and an axially extending, radially outer, tubular section.

\* \* \* \* \*